United States Patent [19]

Poyner et al.

[11] Patent Number: 4,731,949
[45] Date of Patent: Mar. 22, 1988

[54] STABILIZING POLYMERS AND POLYMER FILMS

[75] Inventors: William R. Poyner, Stourbridge; Khirud B. Chakraborty, Birmingham, both of England

[73] Assignee: Robinson Brothers Limited, West Bromwich, United Kingdom

[21] Appl. No.: 910,372

[22] Filed: Oct. 22, 1986

Related U.S. Application Data

[63] Continuation-in-part of Ser. No. 742,085, Jun. 6, 1985, abandoned.

[30] Foreign Application Priority Data

Jun. 15, 1984 [GB] United Kingdom ............ 8415305

[51] Int. Cl.$^4$ ............................................. A01G 7/00
[52] U.S. Cl. .................................... 47/29; 524/202
[58] Field of Search .................... 47/9, 29; 524/202

[56] References Cited

U.S. PATENT DOCUMENTS

| 2,628,952 | 2/1953 | Sanders et al. | 524/202 |
| 3,459,831 | 8/1969 | Lutglass et al. | 47/9 |
| 3,843,595 | 10/1974 | Mathis et al. | 524/203 |
| 3,857,934 | 12/1974 | Bernstein et al. | 47/28 |
| 3,896,585 | 7/1975 | Miller et al. | 47/9 |
| 4,006,119 | 2/1977 | Beadle | 524/202 |
| 4,121,025 | 10/1978 | Scott | 524/202 |
| 4,189,866 | 2/1980 | Treadaway | 47/29 |
| 4,542,061 | 9/1985 | Fukushima et al. | 47/9 |

FOREIGN PATENT DOCUMENTS 1163875 4/1968 United Kingdom.

OTHER PUBLICATIONS

Al-Malaika, Sabar et al: *Degradation and Stabilization of Polyolefins*, 283-335 (1983).

Primary Examiner—Veronica P. Hoke
Attorney, Agent, or Firm—Parmelee, Bollinger & Bramblett

[57] ABSTRACT

A composition which comprises a polymer and a nickel dialkyldithiocarbamate of the formula $(R^1R^2NCSS)_2Ni$, wherein $R^1$ and $R^2$ are the same or different branched-chain $C_{5-18}$ alkyl groups. Such a composition, which preferably additionally comprises a zinc dialkyldithiocarbamate, can be used, e.g. in film or sheet form, to protect flora at an agricultural or horticultural locus.

26 Claims, No Drawings

STABILIZING POLYMERS AND POLYMER FILMS

CROSS-REFERENCE TO RELATED APPLICATION

This invention is a continuation-in-part of our application, Ser. No. 742,085, filed June 6, 1985 abandoned.

FIELD OF THE INVENTION

This invention relates to stabilising polymers, e.g. clear polyethylene film (or sheet) for outdoor use. More specifically, it relates to low density polyethylene (LDPE) film used in agriculture and horticulture for protecting crops or for maintaining artificial environments more suited, for example by consistently higher humidity and/or temperature, to crop growth than the natural environment would be.

BACKGROUND OF THE INVENTION

It is well known that LDPE and similar polymers, e.g. polyolefines, in such applications, are subject to degradation under the influence of energetic solar radiation, oxygen in the air, and thermal stresses. This degradation leads to loss of strength in the film, so that it readily tears or cracks and thus has a limited service life.

PRIOR ART

Many systems have been proposed for stabilising polyolefines such as LDPE against weathering. These systems generally comprise combinations of one or more ultra-violet (UV) stabilisers with other technical adjuvants such as heat stabilisers. For example, No. GB-A-1163875 discloses combinations of nickel dialkyldithiocarbamates, in which the alkyl groups have 4 to 6 carbon atoms, with 2-hydroxy-4-alkoxybenzophenones. No. GB-A-684976 discloses the use of nickel dialkyldithiocarbamates of the formula $(RR'NCSS)_2Ni$, in which the total number of carbon atoms in the two alkyl groups R and R' is 8 or more. U.S. Pat. No. 3,843,595 describes polymers stabilised with a nickel dialkyldithiocarbamate, a phenyl hydroxybenzoate and a zinc dialkyldithiocarbamate, wherein the alkyl groups of the dithiocarbamates have up to 20 carbon atoms.

Such systems perform well in laboratory tests and in simple outdoor conditions but, surprisingly, they do not perform as well as expected when used under conditions prevailing in agriculture and horticulture. It has not hitherto been recognised that agricultural and horticultural film is additionally exposed to pesticidal chemicals in a manner that adversely affects its weathering resistance.

Chakraborty et al, Plastics and Rubber Processing and Applications 3 (1983) 59–64, show that metal dithiocarbamates, and especially zinc diisononyldithiocarbamate and nickel diisononyldithiocarbamate, chosen for their solubility in polyolefins, are effective UV stabilisers, melt stabilisers and heat (oven-ageing) stabilisers for, for example, polypropylene. The zinc compound is said to be more effective as a heat stabiliser, and the nickel compound as a light stabiliser, while a combination of the two is preferred.

FURTHER BACKGROUND

Chakraborty et al, Polymer Degradation and Stability 8 (1984) 1–11, report that the higher molecular weight homologues (butyl, hexyl and octyl) in the zinc dialkylthiocarbamate series have been found to be much more effective UV stabilisers in polypropylene than the methyl and ethyl analogues, and show that this effect is due to the increased equilibrium solubilities of the former in the polymer. At a given molar concentration, the UV stabilities and UV screening and peroxidolytic activities of the various members of the series are very similar, but the relationship between their UV stabilising activities and concentration is non-linear.

SUMMARY OF THE INVENTION

Polymer, e.g. LDPE, compositions, containing stabilisers, have been found which can be resistant to weathering, even in the presence of fumigant chemicals or when exposed accidentally to sprays of other pesticidal chemicals, and which can be innocuous per se, during processing and in the final film which may be produced. Such compositions comprise a UV absorber which is a nickel dithiocarbamate of the formula $(R^1R^2NCSS)_2Ni$, wherein $R^1$ and $R^2$ are the same or different branched-chain $C_{5-18}$ alkyl groups. The compositions are provided as films or sheets, for agricultural or horticultural use.

DETAILED DESCRIPTION OF THE INVENTION

The polymer is preferably of the thermoplastic (as opposed to rubbery) type, e.g. a polyolefine such as polyethylene or polypropylene, and most preferably LDPE. The film or sheet may be prepared, after admixture and processing of the polymer and the stabiliser, by any conventional procedure such as compression-moulding. The mass temperature during film blowing is (for LDPE) 150° up to 210° C., preferably 180° C. The optimal temperature depends on the melt index of the LDPE used; examples are Hostalen LD D 1018 (density 0.918 g/cm$^3$, MFI 190/2.16=0.20 to 0.35 g/10 min) or D 2022 (density 0.922 g/cm$^3$, MFI 0.20 to 0.35 g/10 min). Alternatively, for an ethylene-vinyl acetate copolymer, the processing temperature is 150° to 190° C., VAC-content is about 14%; a typical polymer is Riblene D DV 2035 (MFI 190/2.16=0.3, density=0.935).

The film or sheet is preferably about 0.05 to about 1 mm, more preferably about 0.1 to about 0.5 mm thick, for effective utility in the protection of flora at an agricultural or horticultural locus. The film or sheet is used to provide a cover over flora. For example, a row of vegetables is covered by a flexible film supported on hoops, spaced-apart along the row. Alternatively, a thicker, semi-rigid sheet is used in a greenhouse or other framed structure.

In the stabiliser, examples of $R^1$ and $R^2$ are isoamyl (3-methylbutyl), 2-ethylhexyl and the higher isoalkyl groups which are usually obtained as complex mixtures of alkyl groups branched at various points in the main chain, e.g. in which $R^1$ and $R^2$ each have at least 7 carbon atoms (and an aggregate carbon atom number of, for example, 14 to 30). $R^1$ and $R^2$ are often the same. The effectiveness of corresponding dithiocarbamates in which $R^1$ and $R^2$ are alkyl groups having less than 5 or more than 18 carbon atoms is apparently less than those used in the present invention.

Particularly preferred nickel dithiocarbamates are those containing isononyl groups which have sufficient chain length and branching to give good solubility in polymers such as polyethylene, without also diluting excessively the UV stabilising portion of the molecule, i.e. the (partial) structure N—CS—S—Ni—S—CS—N. A preferred nickel diisononyldithiocarbamate is one in which $R^1=R^2=C_9H_{19}$ and the $C_9H_{19}$ groups contain a major amount of 3,5,5-trimethylhexyl isomer. This material has an acute oral $LD_{50}$ greater than 16 g/kg in the rat and caused no mortality to rainbow trout at a concentration in water of 10 mg/liter.

The nickel dithiocarbamates used in the invention are advantageously combined with other stabilising additives, especially the synergic UV stabilisers such as the hydroxybenzophenones, particularly 2-hydroxy-4-alkoxybenzophenones, e.g. 2-hydroxy-4-octyloxybenzophenone (Cyasorb UV 531) and Hostavin ARO 8. Another preferred additive is a zinc dialkyldithiocarbamate of the formula $(R^3R^4NCSS)_2Zn$, wherein $R^3$ and $R^4$ are the same or different branched-chain $C_{5-18}$ alkyl groups (which may be the same as $R^1$ and $R^2$). The zinc dithiocarbamates function as thermal anti-oxidants and have environmental safety and stability to pesticidal formulations of the same order as have the nickel dithiocarbamates.

$R^1$, $R^2$, $R^3$ and $R^4$ are of course each branched-chain alkyl. Corresponding straight-chain alkyl dithiocarbamates are generally less soluble in the polymer. This can be observed by incorporating the respective corresponding dithiocarbamates in, say, polypropylene at various concentrations, and measuring the UV absorbence immediately after compression-moulding into films of standard thickness. The UV absorbence of the additive in a polymer is directly proportional to the true solubility of the additive in the polymer. For example, the initial UV absorbences (at 285 nm) of zinc dihexyldithiocarbamate and zinc dioctylthiocarbamate (both straight-chain alkyl) in polypropylene, at a concentration of $10^{-3}$ mole/100 g, are about 0.7; the corresponding values for zinc di(2-ethylhexyl)dithiocarbamate and zinc diisononyldithiocarbamate are between 0.8 and 0.9. The observation can be confirmed by measuring the solubility of the respective dithiocarbamates in a hydrocarbon solvent. Zinc dibutyl-, dihexyl- and dioctyldithiocarbamates (straight-chain alkyl) have solubility values of 116, 246 and 245 mg/100 g cyclohexane and 30 C; the corresponding values for zinc di(2-ethylhexyl)dithiocarbamate and zinc diisononyldithiocarbamate are 302 and 311 mg/100 g.

The amount of the nickel dialkyldithiocarbamate in a film or sheet of the invention may be from 0.01 to 5, more preferably 0.1 to 1, and often no more than 0.4, part by weight per 100 parts by weight polymer. If included, the amount of zinc dialkyldithiocarbamate will preferably be in the same range.

The formulation used in the invention should be kept as simple as possible, to provide maximum light transmission consistent with maintaining mechanical properties and minimising surface blemishes which increase the reflectivity of the film or sheet. The quality of the surface can be improved by adding lubricants or release agents, typically soaps such as stearates. The mechanical properties can be improved with additives such as zinc oxide.

DESCRIPTION OF THE PREFERRED EMBODIMENTS

The invention is illustrated in more detail by the following Examples. All percentages are by weight, unless otherwise indicated. The following abbreviations are used:

NiDNC: nickel dialkyldithiocarbamate (predominantly diisononyldithiocarbamate)
ZnDNC: zinc dialkyldithiocarbamate (predominantly diisononyldithiocarbamate)
NiBuD: nickel dibutyldithiocarbamate
ZnBuD: zinc dibutyldithiocarbamate
HOBP: 2-hydroxy-4-octyloxybenzophenone
DTPS: di(2,2,6,6-tetramethyl-4-piperidinyl)sebacate (a hindered amine)
TBNi: 2,2'-thiobis(4-tert-octylphenolato)-n-butylamine nickel (a nickel chelate)
HTOPT: a polymeric hindered amine based on N,N"-1,6-hexane-bis(N'-tert-octyl-N-2,2,6,6-tetramethyl-4-piperidyl-1,3,5-triazine-2,4-diamine)
LDPE: low density polyethylene

Example 1

LDPE was mixed in a Brabender Plasticoder with 0.2% HOBP and 0.2% of a UV absorber, and extruded into film at various temperatures. The % loss of UV absorber was determined spectrophotometrically. The particular UV absorbers and extrusion temperatures, and the results, are shown in Table 1.

TABLE 1

| | Percentage loss of UV absorber during extrusion | | | |
|---|---|---|---|---|
| | Extrusion Temperature (°C.) | | | |
| UV absorber | 180 | 200 | 220 | 250 |
| NiDNC | 0 | 2.5 | 5.0 | 8.5 |
| ZnDNC | 0 | 0 | 0 | 0 |
| DTPS | 1.0 | 3.0 | 6.5 | 12.0 |
| TBNi | 0 | 3.5 | 9.5 | 19.0 |

It was observed that films containing nickel dithiocarbamate were clear and tinged with green, and this appearance was unaffected by extrusion temperature. The films containing zinc dithiocarbamate were clear, colourless and unaffected by extrusion temperature. Films containing hindered amine were clear and colourless but tended to develop surface bloom when extruded at the higher temperatures. Films containing nickel chelate were clear and faint green but gave off an odour of amine during extrusion and developed bloom and a deeper green at the higher extrusion temperatures. Thus, the nickel and zinc dithiocarbamates did not release decomposition products during processing and did not leave residues in the form of surface bloom.

The compression-moulded films were exposed to 4% aqueous solutions of soap (Lux flakes) or methyl isothiocyanate ($CH_3NCS$) to simulate exposure to chemicals encountered in agriculture. Methyl isothiocyanate is the volatile decomposition product of the soil sterilising agent Metham-Sodium. Soaps and surfactants are commonly used in spray formulations. LDPE films without additives were used as controls.

Films were immersed in soap solution for 3 hours at 70° C. before irradiation in a UV cabinet. Films were immersed in methyl isothiocyanate solution for 24 hours at 20° C. before each period of 175 hours irradiation in the UV cabinet.

The extent of degradation of the films was monitored by measuring the carbonyl index. A carbonyl index value of 20 in LDPE corresponds approximately to a 50% reduction in tensile strength after which LDPE film would be unsuitable for further use. The results are shown in Table 2.

TABLE 2

| | Carbonyl index values after UV irradiation | | | | | |
|---|---|---|---|---|---|---|
| | Soap treated | | | CH₃NCS treated | | |
| UV absorber | 600 (hrs) | 900 | 1200 | 600 (hrs) | 900 | 1200 |
| None (control) | 5 | 10 | 16 | 5 | 10 | 16 |
| NiDNC | 1 | 1 | 1 | 0.5 | 0.5 | 0.5 |
| DTPS | 3 | 5 | 8 | 1 | 1 | 2 |
| TBNi | 1.5 | 2 | 2 | 1 | 4 | 8 |

It can be seen that the nickel dithiocarbamate was resistant to both treatments whereas the hindered amine was affected by soap extraction and the nickel chelate by reaction with methyl isothiocyanate.

Example 2

Compression-moulded films were prepared from LDPE blened with equal weights of HOBP and a UV absorber. In Series A, the concentrations were 0.2% HOBP and 0.2% absorber; films containing 0.2% HOBP, 0.2% NiDNC and 0.1% ZnDNC also tested. In Series B, the concentrations were 0.4% HOBP and 0.4% UV absorber, and also 0.1% ZnDNC in combination with 0.4% NiDNC and 0.4% HOBP.

The films were immersed in a 4% aqueous suspension of cypermethrin formulation (AmbushG) for 24 hours at 20° C. before a period of 175 hours irradiation in a UV cabinet. LDPE films containing no additive and either untreated or treated with cypermethrin were used as controls. The extent of degradation was monitored by measuring the carbonyl index. The UV absorbers and the results are shown in Table 3.

TABLE 3

| | Carbonyl index values after UV irradiation | | | | | |
|---|---|---|---|---|---|---|
| UV absorber | 450 Untreated (hrs) | 750 | 1050 | 450 Treated with cypermethrin (hrs) | 750 | 1050 |
| None (control) | 3.5 | 7 | 13.5 | 7.5 | 13 | 20 |
| | Series A (treated) | | | Series B (treated) | | |
| NiDNC | 2 | 5 | 8 | 1 | 1 | 2 |
| DTPS | 6 | 11 | 19 | 2 | 5 | 9 |
| TBNi | 3 | 6.5 | 12 | 1 | 2 | 4 |
| NiDNC + 0.1% ZnDNC | 1.8 | 2.6 | 4 | 0.7 | 0.7 | 0.7 |

It can be seen from the results on the controls that cypermethrin has a prodegradant effect. The films in Series A were all affected by the treatment but the films containing nickel dithiocarbamate, especially in combination with zinc dithiocarbamate, gave the best protection. At the higher stabiliser concentrations in Series B, the duration of protection is prolonged. This is confirmed by the irradiation times needed to reach a carbonyl index value of 20, which corresponds to a reduction of 50% in the tensile strength of LDPE (after which the LDPE is unsuitable for practical use). The irradiation times are given in Table 4.

TABLE 4

| | Time (hours) to reach carbonyl index 20 | |
|---|---|---|
| | Series A | Series B |
| NiDNC | 1500 | 2040 |
| DTPS | 1125 | 1450 |
| TBNi | 1380 | 1700 |
| NiDNC + 0.1% ZnDNC | 1750 | 2440 |

Example 3

Polypropylene was processed for 10 minutes at 180° C. in a RAPRA Torque Rheometer in five series of experiments, three of which were controls using either no additive or a (C₄ alkyl)dithiocarbamate. The amount of any additive was 0.2%. In each case, samples were subjected to oven-ageing at 140° C., to determine thermal oxidative stability, and to irradiation in a UV cabinet to determine the UV stability. The results are given in Table 5.

TABLE 5

| | Embrittlement Times (hours) | | |
|---|---|---|---|
| | | UV Stability | |
| Additive | Thermal Stability | Additive Alone | Additive + 0.2% HOBP |
| None | 0.5 | 70 | 400 |
| ZnBuD | 32 | 170 | 945 |
| ZnDNC | 92 | 385 | 1410 |
| NiBuD | 47 | 796 | 1740 |
| NiDNC | 52 | 1160 | 2250 |

Example 4

Compression-moulded films 0.25 mm thick were prepared from LDPE blended with UV absorbers and subjected to Xenotest irradiation with and without exposure to Metham Sodium and Deltamethrin. A composition according to the invention, i.e. 0.15% HOBP and 0.15% NiDNC, was compared with 0.30% of the polymeric hindered amine HTOPT, chosen to resist extraction from the film during treatment with the pesticides.

In preliminary tests, HTOPT had been shown to be superior to the hindered amine DTPS. For example, 0.1 mm LDPE films containing 0.15% HTOPT retained 100% relative elongation after UV irradation for more than 5000 h while films containing 0.15% DTPS or 0.10% HOBP plus 0.25% NiDNC failed at 5000 h. Similarly, 0.08 mm LDPE film containing 0.30% HTOPT retained 80% relative elongation after irradiation for more than 2000 h, and failed at 4000 h, while film containing 0.15% HOBP and 0.15% NiDNC retained 80% elongation for less than 1000 h and failed at 1100 h.

The resistance of the films to UV irradiation after treatment with pesticide was measured by the carbonyl index. The results were as given in Table 6.

TABLE 6

| | Untreated | | | Treated with Metham Na | | | Treated with Deltamethrin | | |
|---|---|---|---|---|---|---|---|---|---|
| | Irradiation (hours) | | | | | | | | |
| UV Absorber | 600 | 900 | 1200 | 600 | 900 | 1200 | 600 | 900 | 1200 |
| None | 0.6 | 1.0 | 1.6 | 2.2 | 3.2 | — | 0.8 | 1.1 | 1.9 |
| 0.3% HTOPT | 0.2 | 0.4 | 0.8 | 2.3 | 4.0 | — | 0.2 | 0.5 | 1.2 |
| 0.15% HOBP + 0.15% NiDNC | 0.3 | 0.4 | 0.6 | 0.3 | 0.5 | 0.9 | 0.3 | 0.4 | 0.6 |

It can be seen that Deltamethrin, the brominated analogue of Cypermethrin, has only a slight pro-degradant effect on unstabilised film but has an adverse effect on the stabilisation by HTOPT. The composition of the invention is almost completely resistant to both pesticide treatments.

The following were formulated:
LDPE: 100 parts
Calcium stearate: 0.2 parts
ZnDNC: 0.05 parts
NiDNC: 0.05 parts
HOBP: 0.10 parts The components were blended and processed into film 0.1 mm thick. This flexible film was suitable for use in a cloche, to cover a row of vegetables or other flora.

Example 6

The procedure of Example 5 was followed, using the same formulation plus 0.05 part zinc oxide. Increased mechanical strength was observed.

Example 7

The following were formulated:
LDPE: 100 parts
Butylated hydroxytoluene (antioxidant): 0.05 parts
NiDNC: 0.12 parts
HOBP: 0.18 parts The components were blended and processed into film about 0.2 mm thick. The composition had a satisfactory level of UV stability. The film was suitable for use in a cloche, to cover a row of vegetables or other flora.

Example 8

The procedure of Example 7 was repeated but, in order to increase the UV stability to a high level, the amounts of NiDNC and HOBP were each increased by the same factor, to 0.6 part and 0.9 part, respectively.

In terms of service life, appearance and other properties, the products of Examples 7 and 8 were superior, weight for weight, to products obtained from formulations changed only by (with respect to Example 7) replacing 0.12 parts NiDNC by 0.15 parts TBNi and reducing the amount of HOBP to 0.15 parts and similarly (with respect to Example 8, replacing the 0.6 parts NiDNC by 1.0 part TBNi and reducing the amount of HOBP to 0.5 part.

What we claim is:

1. In a method of protecting flora at an agricultural or horticultural locus and maintaining an artificial environment more suited to growth of the flora than the natural environment by placing a polymeric film or sheet in the path of sunlight to the flora or to the locus of the flora, the improvement comprising placing in the said path a stabilised polymeric film or sheet rendered more resistant to weathering in the presence of fumigant and pesticidal chemicals adversely affecting its weather resistance wherein said polymeric film or sheet has been formed from a composition which comprises a polymer and an effective stabilising amount of a nickel dialkyldithiocarbamate of the formula $(R^1R^2NCSS)_2Ni$, wherein $R^1$ and $R^2$ are the same or different branched-chain alkyl groups of 5 to 18 carbon atoms.

2. In a method of protecting flora at an agricultural or horticultural locus and maintaining an artificial environment more suited to growth of the flora than the natural environment by placing a polymeric film or sheet in the path of sunlight to the flora or to the locus of the flora, the improvement comprising placing in the said path a stabilised polymeric film or sheet rendered more resistant to weathering in the presence of fumigant and pesticidal chemicals adversely affecting its weather resistance wherein said polymeric film or sheet has been formed from a composition which comprises a polymer and an effective stabilising amount of a nickel dialkyldithiocarbamate of the formula $(R^1R^2NCSS)_2Ni$, wherein $R^1$ and $R^2$ are the same or different branched-chain alkyl groups of 5 to 18 carbon atoms and a zinc dialkyldithiocarbamate of the formula $(R^3R^4NCSS)_2Zn$, wherein $R^3$ and $R^4$ are the same or different branched-chain alkyl groups of 5 to 18 carbon atoms.

3. A method according to claim 1 wherein the nickel dialkyldithiocarbamate is present in the composition in an amount of from 0.01 to 5 parts by weight per 100 parts by weight polymer.

4. A method according to claim 1 wherein the nickel dialkyldithiocarbamate is present in the composition in an amount of from 0.1 to 1 parts by weight per 100 parts by weight polymer.

5. A method according to claim 2 wherein the nickel dialkyldithiocarbamate and the zinc dialkyldithiocarbamate are each present in the composition in an amount of from 0.01 to 5 parts by weight per 100 parts by weight polymer.

6. A method according to claim 2 wherein the nickel dialkyldithiocarbamate and the zinc dialkyldithiocarbamate are each present in the composition in an amount of from 0.1 to 1 parts by weight per 100 parts by weight polymer.

7. A method according to claim 1 wherein $R^1=R^2=C_9H_{19}$.

8. A method according to claim 1 wherein the major portion of the alkyl groups is comprised by the 3,5,5-trimethylhexyl isomer.

9. A method according to claim 1 wherein the polymer is selected from the group consisting of polyethylene and polypropylene.

10. A method according to claim 1 wherein the polymer also contains a light-stabilising effective amount of a benzophenone UV light stabiliser.

11. A method according to claim 10 wherein the benzophenone is a 2-hydroxy-4-alkoxybenzophenone.

12. A method according to claim 11 wherein the benzophenone is 2-hydroxy-4-octyloxybenzophenone.

13. A method according to claim 10 wherein the benzophenone:nickel dialkyldithiocarbamate ratio is about 3:2 w/w.

14. A method according to claim 1 wherein the composition comprises additionally a soap in a lubricating amount.

15. A method according to claim 1 wherein the composition comprises additionally zinc oxide in a mechanical property improving amount.

16. A method according to claim 2 wherein $R^1$, $R^2$, $R^3$ and $R^4$ are the same.

17. A method according to claim 2 wherein $R^1=R^2=C_9H_{19}$.

18. A method according to claim 16 wherein $R^1=R^2=R^3=R^4=C_9H_{19}$.

19. A method according to claim 2 wherein the major portion of the alkyl groups is comprised by the 3,5,5-trimethylhexyl isomer.

20. A method according to claim 2 wherein the polymer is selected from the group consisting of polyethylene and polypropylene.

21. A method according to claim 2 wherein the polymer also contains a light-stabilising effective amount of a benzophenone UV light stabiliser.

22. A method according to claim 21 wherein the benzophenone is a 2-hydroxy-4-alkoxybenzophenone.

23. A method according to claim 22 wherein the benzophenone is 2-hydroxy-4-octyloxybenzophenone.

24. A method according to claim 21 wherein the benzophenone:nickel dialkyldithiocarbamate ratio is about 3:2 w/w.

25. A method according to claim 2 wherein the composition comprises additionally a soap in a lubricating amount.

26. A method according to claim 2 wherein the composition comprises additionally zinc oxide in a mechanical property improving amount.

* * * * *